United States Patent Office
3,511,108
Patented May 12, 1970

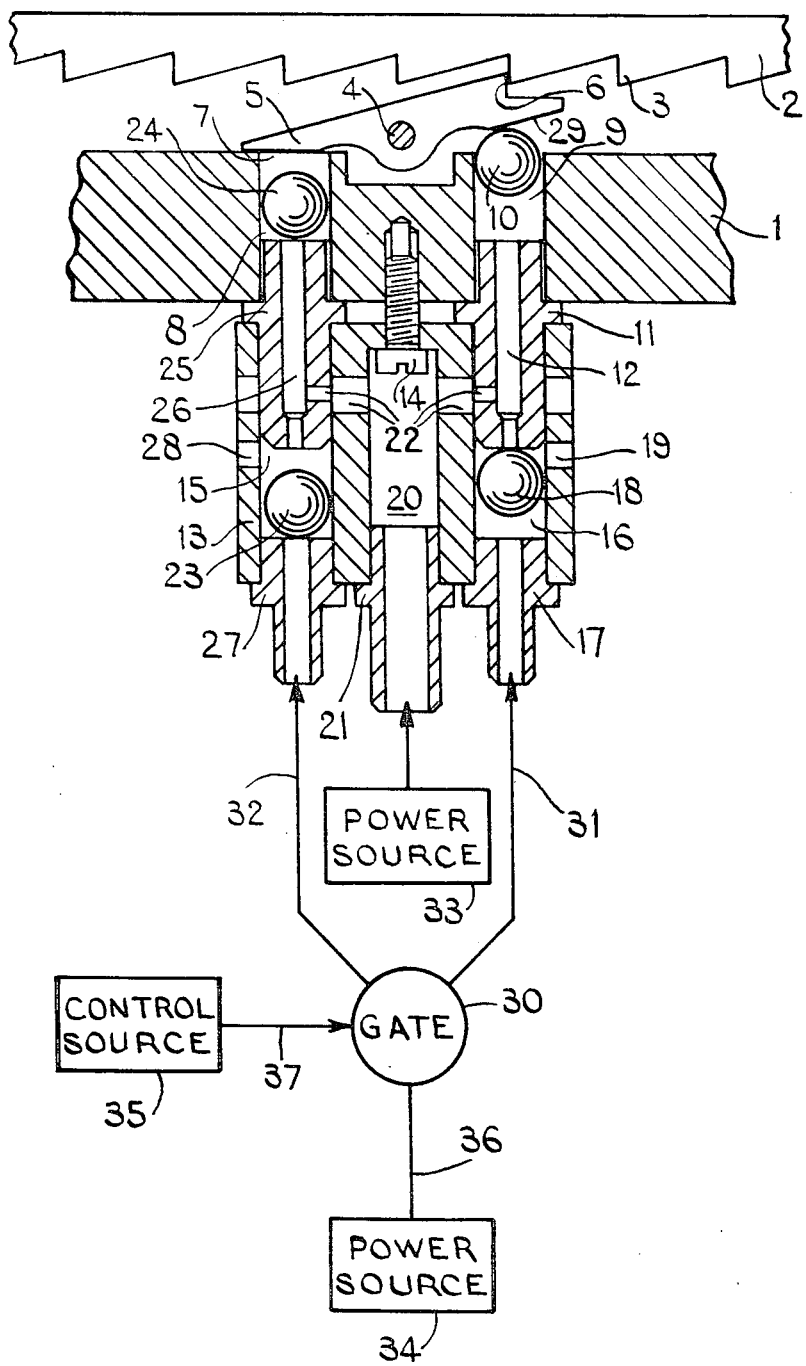

3,511,108
MOTION ARRESTING DEVICES
Raymond Walter Meldrum, Harpenden, England, assignor to International Computers and Tabulators Limited, London, England, a British company
Filed June 11, 1968, Ser. No. 736,156
Claims priority, application Great Britain, June 13, 1967, 27,116/67
Int. Cl. G05g 5/06
U.S. Cl. 74—529
4 Claims

ABSTRACT OF THE DISCLOSURE

A motion arresting device wherein a movable projection carrying member has its line of motion obstructed by a pivotable member carrying a projection engaging surface. Fluid sources and control means alternately pivot the engaging member into an engaged position and retracted position to arrest and allow motion of the projection carrying member, respectively. Application of fluid pressure to a ball freely movable in a guide channel causes pivoting of the engaging member into the path of the movable member, thereby arresting its motion. By switching fluid pressure to another freely movable ball and guide arrangement, the engaging member is pivoted so as to retract the projection engaging surface from the path of the projection carrying member, thereby allowing motion of the same.

BACKGROUND OF THE INVENTION

The present invention relates to devices for arresting relative motion between two members.

It has previously been proposed to provide apparatus for selectively arresting relative motion between two members by providing projections on one member and a selectively operable pawl on the other. The pawl has been operated by purely mechanical or by electromagnetically operable means. In order to operate such apparatus from fluid-actuated devices it has hitherto been necessary to provide conversion arrangements, such as pneumatic-to-electrical transducers or piston-operated mechanical linkages, for example. Electrical transducers are relatively complex devices and mechanical linkages frequently require considerable power for their operation due to the high mass and/or friction associated with the operation of piston actuated linkages.

SUMMARY OF THE INVENTION

According to the present invention, a motion arresting device includes a first member carrying at least one projection relatively movable with respect to a pivoted second member having a projection engaging surface, the second member being pivotable between a retracted position and an operated position, in which operated position the engaging surface projects into the path of said projection to arrest the relative movement, by the selective application of fluid pressure to a pair of balls freely moveable in guide channels, the balls respectively acting on said second member on opposite sides of the pivot, and means for controlling the selective application of fluid pressure to the channels.

According to another aspect of the invention, in such a motion arresting device the controlling means includes means for applying fluid at a first pressure to the guide channels, means for venting each channel, a ball valve for each channel moveable to seal the venting means for that channel, and a fluid passage associated with each ball valve, the ball valves being movable in response to the selective application to said passages of fluid at a second pressure lower than said first pressure.

BRIEF DESCRIPTION OF THE DRAWING

One embodiment of the invention will now be described with reference to the accompanying drawing, in which:

The sole figure shows a device for arresting the motion of a protection carrying member as well as associated fluid power sources and controls therefor.

Referring now to the drawing, an arresting station block 1 is supported in spaced relationship to a bar 2. The bar 2 carries teeth 3 and is supported for longitudinal movement relative to the block 1. The block 2 supports a pivot 4 and a member 5 is mounted on the pivot 4. The member 5 has one end 6 formed into an arresting surface and is rockable about the pivot 4 into an operating position, as shown in the drawing, in which the arresting surface 6 projects sufficiently from the block 1 to engage a tooth 3 of the bar 2. When rocked into its other extreme position, the member 5 occupies a retracted position in which the surface 6 is withdrawn from the path of the teeth 3 of the bar 2.

Both ends of the member 5 carry faces 7 and 29 and the rocking movement of the member 5 is limited by the contact of one or other of the faces 7 and 29 with the block 1. The block carries two guide channels 8 and 9, positioned opposite the faces 7 and 29 of the member 5, respectively. Each of the channels 8 and 9 carries a freely moveable ball 24 and 10, respectively. Connecting pieces 11 and 25 are inserted into each of the channels 8 and 9 and each connecting piece has a central bore 12 and 26, respectively, extending throughout its length. The connecting pieces 11 extend from the block 1 into holes in a connection block 13, the block 13 being secured to the block 1 by a screw 14, the arrangement being such that the screw 14 both clamps the blocks 13 and 1 together and holds the connecting pieces 11 and 25 in place. The holes of the block 13 extend beyond the ends of the connecting pieces 11 and 25 to form valve chambers 15 and 16 respectively. The chambers 15 and 16 are terminated by hollow connectors 27 and 17 and each chamber contains a freely moveable ball 23 and 18, respectively. Vents 28 and 19 are formed in the wall of each chamber 15, 16 close to the end of the connecting piece 11.

A further chamber 20 is formed in the block 13, between the chambers 15 and 16, and the chamber 20 is also provided with a hollow connector 21. The chamber 20 is connected to the bores of the connecting pieces 11 by holes 22 formed in the walls of the chamber 20 and the connecting pieces 11.

A fluid power source 33, which may be of any conventional type or design, is operative to supply a continuous fluid flow through hollow connector 21 to chamber 20 at a constant pressure. Another fluid power source 34 produces a fluid flow through transmission pipe 36, fluid logic gate 30, through transmission pipes 31 or 32 to hollow connectors 17 or 27, respectively. The pressure of the fluid flow produced by power source 34 is lower than the pressure of the fluid flow produced by power source 33. Also, a control source 35 produces a control or deflection fluid flow through transmision pipe 37 to fluid logic gate 30. Thus, upon receipt of fluid flow from power source 34, gate 30 allows fluid flow in transmission pipe 31 or 32 in dependence upon the deflection fluid flow produced by control source 35. Since the particular detailed structure of fluid power sources 33, 34 and 35 and fluid logic gate 30 form no part of the present invention, these conventional devices are shown in schematic form only.

In operation, hollow connectors 17 and 27 are coupled by fluid transmission pipes 31 and 32, respectively, to the outputs of fluid logic gate 30, which may be a two-outlet fluid amplifier. In a device of this kind, a fluid stream, usually referred to as a power stream, is diverted from one outlet to the other by an auxiliary control stream supplied by control source 35. The logic gate 30 is said to be switched when such a diversion takes place and the gate may be reset as a result of an opposite controlling action so that the power stream is once again returned to issue from the first outlet.

As stated previously, connector 21 is connected to fluid power source 33, the pressure of which is higher than that of fluid from source 34 and delivered to connectors 17 or 27. This fluid enters chamber 20 and pases therefrom through holes 22 into bores 12 and 26 of connecting pieces 11 and 25, respectively. In the absence of fluid from power source 34 in chambers 15 and 16, the fluid from chamber 20 passes from bores 12 and 26 of connecting pieces 11 and 25 into chambers 15 and 16 and out through vents 19 and 28.

If, now, it is assumed that fluid power source 34 is switched so that fluid passes from its outlet through transmission pipe 36 and through fluid logic gate 30 only into chamber 16, as shown in the drawing, then ball 18 in chamber 16 is displaced towards the end of connecting piece 11 lying within chamber 16. The bore 12 of the connecting piece 11 is restricted at this end with the result that the total force exerted on the ball 18 by fluid from the chamber 20 is less than that exerted by fluid in the chamber 16, with the result that the ball 18 seals the bore 12 of this connecting piece and prevents fluid from the bore 12 passing to the vent 19. This action results in an increase of pressure in the guide chanel 9, and the ball 10 in the channel 9 is moved to project from the channel 9. This movement causes the member 5 to pivot anti-clockwise, as shown in the drawing, to bring the surface 6 into a position to engage a tooth 3 of the bar 2, the bar 2 moving from right to left in the drawing. Engagement of the surface 6 with the tooth 3 arrests movement of the bar 2. At this time, because only the chamber 16 is receiving fluid from the fluid power source 34 the ball 23 in chamber 15 is displaced from the end of the associated connecting piece 25 and fluid from the chamber 20 is vented from the chamber 15. Thus the ball 24 in guide channel 8 does not act on the member 5 at this time.

Before a new selection cycle commences, the arresting mechanism and the bar 2 are reset. It will be appreciated that the bar 2 may be reset by being moved from left to right even before the arresting mechanism is reset, the member 5 being displaced in a clockwise direction by the teeth 3 as the bar 2 is moved in this direction. The arresting mechanism is reset by resetting fluid logic gate 30 upon receipt of an appropriate resetting fluid flow from control source 35. Under these circumstances, fluid is delivered from gate 30 only through connector 27 associated with chamber 15. Thus, the ball 23 in chamber 15 is moved to close bore 26 of the associated connecting piece 25, with the result that fluid from channel 20 flows into guide channel 8 and ball 24 to pivot bar 5 in a clockwise direction to remove projection engaging member 6 from the path of bar 2.

It will be seen, therefore, that the chambers 15 and 16 with their associated balls 23 and 18 form ball valves which selectively control the application of fluid pressure from the chamber 20 to the balls 24 and 10 to control the movement of the member 5. By using these ball valves the force available for the operation of the member 5 may be made such greater than can be obtained, for example, from a conventional fluid logic amplifier. Thus, in this case the outputs from such a conventional device are merely required to actuate the ball valves to gate a higher pressure working fluid.

At the same time it is to be understood that where the available fluid pressure from the controlling device is sufficiently great, the balls 10 and 24 may be actuated directly from the outlets of the device. Under these circumstances, the block 13 and the connecting pieces 11 and 25 are omitted, the connectors 17 and 27 from the controlling device being inserted directly into the channels 8 and 9 in place of the connection pieces 11.

Although other materials may be used, it is preferred that the balls 10, 24, 23 and 18 are made from a synthetic plastic material as may be the member 5, in order to reduce the mass of these parts. The use of this material aids in promoting high speed operation of the apparatus. The bar 2 may also be made of a light synthetic plastic material.

While it is usual, particularly in association with, for example, the selective positioning of a type-carryng member of a printing apparatus, for the bar 2 to be moveable and for the arresting station to be fixed, it is to be understood that it is immaterial for the operation of the device which is the fixed and which the moveable member. Furthermore, selective positioning of a bar, such as the bar 2, relative to an arresting station, may be obtained by providing a single arresting station in conjunction with a number of projections or teeth on the bar or, by providing a single projection on the bar in conjunction with a number of arresting stations spaced apart along the path of travel of the bar.

I claim:

1. A motion arresting device including a first projection carrying member relatively moveable with respect to a second member, said second member being pivotable about an axis and being provided with a projection engaging surface, first and second guide channels, first and second balls freely moveable within said first and second guide channels, respectively; said balls acting on said second member on first and second sides of said axis, respectively, a source of fluid pressure, means for selectively applying said fluid pressure to a point in said first guide channel to effect movement of said first ball to cause said second member to pivot into an operated position in which the projection engaging surface of said second member is operative to arrest motion of said first member, and to a point in said second guide channel to effect movement of said second ball to cause said second member to pivot into a retracted position in which said projection engaging surface of said second member allows motion of said first member.

2. A device as claimed in claim 1 including third and fourth guide channels communicating with said first and second guide channels, respectively, third and fourth balls freely moveable in said third and fourth guide channels respectively, said source of fluid pressure including a first supply of fluid pressure interconnected with said first and second guide channels, and a second supply of fluid pressure selectively applied to said third or fourth guide channel.

3. A device as claimed in claim 2 in which said first supply of fluid pressure is normally vented from said third and fourth guide channels and wherein application of said second supply of fluid pressure causes said third or fourth ball to close the vent from said third or fourth channel, respectively, and thereby apply said first source of fluid pressure to said first or second ball, respectively.

4. A device as claimed in claim 3 including a fluid logic gate having first and second output channels connected to said third and fourth guide channels, respectively, said second supply of fluid pressure connected to an input of said gate, and a fluid control source for switching the output fluid supplied by said second supply of fluid pressure between said first and second output channels.

References Cited

UNITED STATES PATENTS

| 2,673,624 | 3/1954  | Huber    | 92—28 X  |
| 2,862,402 | 12/1958 | Hamilton | 74—526   |
| 3,125,000 | 3/1964  | Reuter   | 91—186   |
| 3,217,609 | 11/1965 | Royster  | 92—25    |
| 3,251,278 | 5/1966  | Royster  | 92—27 X  |

JAMES A. WONG, Primary Examiner

U.S. Cl. X.R.

74—534; 91—186; 92—28